United States Patent [19]

Dallmann et al.

[11] Patent Number: 4,921,670

[45] Date of Patent: May 1, 1990

[54] PROCESS FOR PRODUCING POLYESTER FILM CONTAINING A SLIP AGENT

[75] Inventors: Hermann Dallmann, Wiesbaden; Lothar Bothe, Mainz-Gonsenheim; Guenther Crass, Taunusstein; Werner Schaefer, Hofheim-Diedenbergen, all of Fed. Rep. of Germany

[73] Assignee: Hoechst Aktiengesellschaft, Frankfurt am Main, Fed. Rep. of Germany

[21] Appl. No.: 218,140

[22] Filed: Jul. 13, 1988

[30] Foreign Application Priority Data

Aug. 1, 1987 [DE]  Fed. Rep. of Germany ....... 3725568

[51] Int. Cl.$^5$ ...................... B29C 47/00; B29C 55/04; B29C 55/12; C08G 77/04
[52] U.S. Cl. ................... 264/141; 264/210.6; 264/211; 264/235.6; 264/235.8; 524/263; 524/266; 524/267; 525/474
[58] Field of Search ............ 264/171, 210.6, 211, 264/235.6, 235.8, 237, 288.4, 290.2, 141; 524/263, 265, 266, 267; 525/474, 479

[56] References Cited

U.S. PATENT DOCUMENTS

| 4,348,510 | 9/1982 | Keck et al. ............... 525/474 X |
| 4,446,090 | 5/1984 | Lovgren et al. ................ 264/211 |
| 4,452,962 | 6/1984 | Ginnings et al. ............... 525/474 X |
| 4,472,556 | 9/1984 | Lipowitz et al. ............. 264/210.6 X |
| 4,496,704 | 1/1985 | Ginnings ................... 525/474 X |
| 4,758,396 | 7/1988 | Crass et al. .................. 264/171 X |
| 4,798,759 | 1/1989 | Dallman et al. ............. 264/235.8 X |

FOREIGN PATENT DOCUMENTS

| 88370 | 9/1983 | European Pat. Off. ............ 264/211 |
| 50-78648 | 6/1975 | Japan .................... 524/267 |
| 50-90715 | 7/1975 | Japan .................... 264/211 |
| 51-28143 | 3/1976 | Japan .................... 524/263 |
| 63-39929 | 2/1988 | Japan .................... 264/210.6 |

*Primary Examiner*—Jeffery Thurlow
*Assistant Examiner*—Leo B. Tentoni
*Attorney, Agent, or Firm*—Foley & Lardner, Schwartz, Jeffery, Schwaab, Mack, Blumenthal & Evans

[57] ABSTRACT

A process is described for the production of an oriented, heat-set polyester film including an admixture of polydiorganosiloxane in the amount of 0.001 to 2% by weight, as well as further additives, such as inert inorganic and/or organic particles. The thermoplastic material is melted in an extruder and extruded through an appropriate die to give a cast film, is then quenched, reheated, stretch oriented, and heat set. The characteristic criteria is the addition of the polydiorganosiloxane to the polydiorganosiloxane-free polyester in the form of a masterbatch.

11 Claims, No Drawings

4,921,670

PROCESS FOR PRODUCING POLYESTER FILM CONTAINING A SLIP AGENT

BACKGROUND OF THE INVENTION

1. Field Of The Invention

The present invention relates to a process for the production of an oriented, heat-set polyester film containing an admixture of polydiorganosiloxane in a quantity of from 0.001 to 2% by weight and optionally further additives comprising inert inorganic and/or organic particles. The process comprises the steps of melting the thermoplastic in an extruder, extruding it through an appropriate die to yield a cast film, then quenching, reheating, stretch orienting, and heat-setting the film.

2. Prior Art

Because of their superior qualities such as their tensile strength, their tear resistance, their modulus of elasticity, their transparency, their chemical and thermal stability, etc., biaxially or multiaxially oriented films made of polyester, particularly polyethylene terephthalate, find great application in many technical areas, such as the reprographic sector, as a dielectric for capacitors, as base films for magnetic recording media, such as audio-, video-, and computer tapes, for magnetic cards, as well as floppy discs.

The polyester films must fulfill specific requirements for the various areas of usage, which must be adjusted during the film production with the aid of raw material formulations or by means of a specific process technology. Thus, for example, polyester films, which are processed into magnetic tapes, should display a lower friction coefficient, as well as high scratch and abrasion resistance during continuous stress, so that the magneto-electric qualities are not adversely influenced. Beyond that, the films that are provided with these qualities should, from a commercial standpoint, be economical to produce. For example, any thermoplastic scrap obtained during the film production should, as much as possible, be completely recyclable as reclaim to the film production process, without there being any negative influence on the quality of the film which was partially produced from reclaimed material.

A film containing polydiorganosiloxane in the area of 0.01 to 2% by weight, is already known from Japanese Pat. No. 50-74,650. With the known film, however, the polysiloxane is added during the polycondensation reaction in the production process of polyester. This may be viewed as a disadvantage, since it is unavoidable that parts of the polydiorganosiloxane decompose under the reaction conditions of polycondensation, whereby the cleavage products once again result in a detrimental effect on the qualities of the films produced from the respective polyesters.

SUMMARY OF THE INVENTION

It is an object of the present invention to create an improved process for the production of a polyester film with an addition of polydiorganosiloxane in the area of 0.001 to 2% by weight. It is a further object of the present invention to provide a process wherein it is especially possible to reuse the reclaim material obtained during the manufacturing of the film, or to recycle the reclaim material repeatedly back into the film manufacturing process.

This problem is solved by a process of the type previously mentioned, wherein the polydiorganosiloxane is added to the polyester which is free from polydiorganosiloxane, in the form of a masterbatch.

DESCRIPTION OF THE INVENTION

In accordance with the invention, the masterbatch particularly comprises a granular shape, essentially homogeneous concentrate of a plastic raw material with a high amount of additives that is used as an important intermediate product in the mass blending, in order to obtain, together with an additive-free raw material, end products which exhibit a precisely defined amount of additives. The masterbatch used according to the invention is characterized by the fact that it contains up to 30% by weight, preferably up to 25% by weight, of polydiorganosiloxane, relative to the total weight of polyester plus polydiorganosiloxane.

In the specification of the invention, the polyesters comprise polyester homopolymers and copolymers, mixtures of various polyesters, as well as mixtures or blends of polyesters with other thermoplastic polymers, such as polyolefin homopolymers or copolymers, polyamides, polycarbonates and ionomers and, optionally, resins.

Examples of polyester are polycondensates derived from terephthalic acid, isophthalic acid, or 2,6-naphthalene dicarboxylic acid with glycols having 2 to 10 carbon atoms, such as polyethylene terephthalate, polybutylene terephthalate, poly-1,4-cyclohexylenedimethylene terephthalate, polyethylene-2,6-naphthalate, or polyethylene -p-hydroxybenzoate, or the like.

The production of the polyesters can be carried out according to the transesterification process, for example, using the catalytic effect of, for example, Zn, Mg, Ca, Mn, Li, or Ge salts and stabilizers such as phosphorus compounds, as well as according to the direct ester process.

The copolyesters can contain as structural units among others, adipic acid, glutaric acid, succinic acid, sebacic acid, phthalic acid, isophthalic acid, 5-Na-sulphoisophthalic acid or polyfunctional acids such as trimellitic acid, or the like.

The polyester mixtures can comprise polyester homopolymers, polyester copolymers or polyester homo and copolymers. Examples are mixtures of polyethylene terephthalate/polybutylene terephthalate, polyethylene terephthalate/polyethylene isophthalate or polyethylene isophthalate/5-sodium-sulphoisophthalate.

Examples of polymers that can be incorporated in or mixed with the polyester are polyolefin homo or copolymers such as polyethylene, polypropylene, poly-4-methylpentene, ionomers, polyamides, polycarbonates, or the like.

The resins comprise natural or synthetic low molecular resins with a softening point in the area of 60–180° C., determined by DIN 1995-U4. Of the numerous types in question, hydrocarbon resins such as styrene resins, cyclopentadiene resins and terpene resins should be mentioned especially.

The film preferably contains finely dispersed inert inorganic and/or organic pigments of such a size and quantity that the surface structure of one side does not negatively affect the surface roughness of the opposite side of the film. This feature is of particular importance if the film of the invention is used as a base film for a magnetic recording material.

Examples of pigments are $CaCO_3$, $BaSO_4$, $SiO_2$, natural and synthetic silicates, natural or pyrogenic aluminum oxide, TiO$_2$, ZnO, MgO and the like, carbon black as well as particles of polymeric materials, such as plastomers, elastomers, duromers. Examples of organic pigment particles are the polymer particles described in German Patent 33 13 923 (equivalent to U.S. Pat. No. 4,568,616).

The pigments can be coated with an adhesion promoter for the purpose of improving the adhesion to the matrix, or—especially in the case of organic particles—they can carry reactive groups. They can be added to the polyester via dispersions, if necessary, with the use of a dispersing agent or coagulation inhibitor, as well as via a masterbatch, optionally together with the polydiorganosiloxane.

Alternatively or supplementary to the organic and inorganic pigments, other particles, so-called catalyst precipitates which are formed during the production of polyester from the catalyst residues with monomers or oligomers of the reactants used, can be used to adjust the surface structure and thus the slip behavior of the film, as already mentioned.

The finely dispersed pigments or catalyst residues have an average particle size of 0.001 to 5 $\mu$m, preferably smaller than or equal to 0.2 to 1.5 $\mu$m. They are used in amounts of 0.001 to 30% by weight, preferably from 0.01 to 5% by weight.

The film produced according to the process of the present invention can contain, besides the mentioned additives, antistats, antioxidants, thermostabilizers, nucleating agents specifically for improving the dimension stability, UV stabilizers, carbon black, dyes and others, alone or in combination. The film produced with the masterbatch preferably contains 0.05 to 2% by weight of polydiorganosiloxane, relative to the weight of the film.

Suitable polydiorganosiloxanes are saturated compounds which are liquid at room temperature. Among them are polydialkylsiloxanes, especially with 1 to 4 carbon atoms per alkyl group, polyalkarylsiloxanes in which aryl preferably stands for phenyl, polydiphenylsiloxanes, modified polydiorganosiloxanes which can be substituted by fluorine, perfluoroalkyl or fatty acid ester groups, as well as polyethersiloxanes.

The viscosity of the polydiorganosiloxanes is greater than 100 millimeter squared per second (mm$^2$/s) at 25° C., preferably 1.000 to 50.000 mm$^2$/s.

Particularly preferred are those polydiorganosiloxanes that are compatible with the polyester of the film and are reclaimable without decomposition. It is surprising that films which contain polydiorganosiloxanes are abrasion resistant and can be reclaimed excellently at the same time. Up until now, polydiorganosiloxanes were customarily used for the improvement of the slip properties and the dyeability in molding compounds, coatings, and magnetic coatings of recording tapes.

The films can also be produced as multi-layer films, in which the individual layers can comprise different polyesters or polymers. Preferably identical polymers comprising different additives in different amounts for each layer are used, particularly polyester homo or copolymers or mixtures of these.

If the film is made up of several layers, at least one layer contains a polydiorganosiloxane in the stated amounts. By means of this lamination the preferred additives can be distributed within the individual layers of the film of this invention according to their special usages.

The layer structure of the film can be either symmetrical or unsymmetrical. The total thickness of the film lies within the range from 1.5 to 350 $\mu$m (microns), a thickness of 5 to 36 $\mu$m being particularly preferred. The outer layer(s) of multi-layer films display(s) a thickness of at least 0.2 $\mu$m, and it is advantageous that these layer(s) contain(s) inert particles (pigments) for improving the handling of the film.

The film of the invention is produced according to the (co)extrusion process, the polydiorganosiloxane being admixed as masterbatch.

The masterbatch is obtained by melting the pulverulent or granular polymer, preferably the polyester raw material, in a twin screw molding unit; injecting the polydiorganosiloxane into the liquid polymer melt by means of a metering pump; and subsequent cooling and quenching. The content of polydiorganosiloxane amounts to more than 5% by weight, preferably 10 to 30% by weight, relative to the total weight of the masterbatch. Despite the partly poor compatibility between polymer raw material, particularly the polyester, and polydiorganosiloxane, a highly concentrated masterbatch can surprisingly be obtained, which in granular form is homogeneous and flowable.

For the preparation of the masterbatch, other polymers besides the polyester materials mentioned can be used, as, for example, polyalkylenes, particularly polypropylene and ionomers, either alone or in a mixture with the polyester materials.

Likewise, the inorganic and/or organic pigments are preferably added to the film according to the masterbatch technique. The same applies to the already mentioned antistats, antioxidants, thermostabilizers, nucleating agents, UV stabilizers, carbon black and dyes.

In the (co)extrusion process, the masterbatch containing polydiorganosiloxane is melted together with the virgin polyester, is then extruded to give a cast sheet, and thereafter cooled and quenched on a cooling drum. This film is drawn longitudinally and/or transversely at temperatures between the glass transition point of the polymer and 160° C., as well as with a draw ratio preferably in the area of 2.0 to 6.0, the draw ratio $\lambda$ preferably being about 3.3 to 4.0. $\lambda$ means the draw ratio of the film in only one direction. At temperatures between 150 and 240° C., thermosetting takes place. The number and sequence of the longitudinal and transverse drawing steps are variable; they depend on the special requirements of, for example, the polymer material used or on the desired mechanical properties of the film. The different draw procedures in the longitudinal or transverse direction can be executed in one or more steps. A simultaneous drawing process is also possible.

The films can either possess a certain tensile strength in one direction (monoaxially drawn), a balanced tensile strength in both directions, or an especially high tensile strength in transverse and/or longitudinal direction (tensilized or supertensilized).

The films produced according to the process of the present invention can advantageously be used as base films for magnetic or optical recording media, for reprographic and photographic applications, as an electric film, or as an embossing and interleaving film, or as a thermal transfer printing material.

In the following examples, as well as in the table, the advantages of the process according to the invention will be explained in greater detail (Examples 1 to 3 and Comparative Examples 4 and 5) and the masterbatches will be characterized (Examples 6 to 8).

The produced films are characterized with regard to their surface roughness ($R_a$ value), their friction coefficients (static and sliding frictions) and their abrasion resistance.

1. Surface roughness:

The surface roughness of a film is numerically determined as the $R_a$ value, which represents an arithmetic mean value of all distances of the roughness profile R from the center line. Measurement is made according to DIN 4768 using a surface measuring instrument (Perthometer SP6) manufactured by Feinpruef GmbH (limited), Goettingen, Federal Republic of Germany. The specified values are based on six individual measurements, of which the highest value was not taken into consideration in calculating the mean value. The cut-off, that is, the respective length of the measured individual sections was 0.25 mm, each.

2. Friction coefficients:

The coefficients of static as well as sliding friction were determined according to DIN 53 375. They specify the slip properties of the film.

3. Abrasion resistance:

The abrasion resistance was determined using a specifically developed measuring instrument, wherein a film band, 12.5 mm wide, is conveyed at a speed of 40 m/min. and a constant web tension first over cleaning rolls, then over a fixed rod of stainless steel having an outside diameter of 5 mm and thereafter over two rubber rolls which serve as measuring rolls. The deposits on the rubber rolls are judged according to a measurement scale from 1, or very little abrasion, through 6, or a great deal of abrasion.

EXAMPLES 1 to 3

In each case, polyethylene terephthalate raw material was prepared with an amount of inorganic particles as specified in the table, and was mixed with a masterbatch, comprising 80% by weight polyethylene terephthalate and 20% by weight polydimethylsiloxane, so that the mixture showed a content of polydimethylsiloxane of 0.1 or 0.05% by weight. After drying at 180° C., the respective mixtures were melted and extruded through a slot die onto a high gloss-polished cooling roll. The thus obtained amorphous cast sheet was heated by means of rolls and stretched longitudinally at 95° C. and transversely at 115° C., the draw ratio λ being 3.5 in each case. The biaxially oriented films obtained were heat-set at a tenter (frame) temperature of 220° C.

COMPARATIVE EXAMPLES 4 and 5

The comparative examples correspond to the Examples 1 to 3, except that no polydiorganosiloxane-containing masterbatch was added.

EXAMPLES 6 to 8 (Masterbatches)

On a twin screw molding unit pellets were produced from:

Example 6: a polyethylene terephthalate powder and 20% by weight polydimethylsiloxane having a viscosity of 30.000 mm²/s, Example 7: granular polyethylene terephthalate, 10% by weight, ionomer resin (Surlyn 1601 ®) and 20% by weight of polydimethylsiloxane from Example 6, Example 8: granular polyethylene terephthalate and 10% by weight of a batch made of 70% by weight of a polypropylene (melt flow index=20 g/10 min, melting point 165° C.) and 30% by weight of a polydiorganosiloxane at mass temperatures of 260° C., the polydiorganosiloxane being added according to Examples 6 and 7 by means of a metering pump.

In all cases, flowable homogeneous pellets were obtained.

Films with properties shown in the table were produced from all pellets.

TABLE

| Examples | Pigments Pigment | Pigments Amount (ppm) | Amount Of Polydiorganosiloxane % By Weight | Film Thickness (μm) | Surface Roughness ($R_a$-Value) | Friction Coefficients Static Friction | Friction Coefficients Sliding Friction | Abrasion Resistance On A Scale Of 1 to 6 | Heat-Setting Temperature (°C.) |
|---|---|---|---|---|---|---|---|---|---|
| Example 1 | Kaolin Areosil | 4000 2000 | 0.1 | 15 | 0.029 | 29 | 30 | 1 | 220 |
| Comparative Example 4 | Kaolin Areosil | 4000 2000 | 0 | 15 | 0.027 | 32 | 32 | 5 | 220 |
| Example 2 | BaSO₄ FX BaSO₄ XR | 3000 100 | 0.05 | 23 | 0.021 | 33 | 33 | 1 | 219 |
| Comparative Example 5 | BaSO₄ FX BaSO₄ XR | 3000 100 | 0 | 23 | 0.019 | 35 | 32 | 5 | 219 |
| Example 3 | BaSO₄ FX | 3000 | 0.05 | 12 | 0.021 | 44 | 39 | 1 | 215 |

Test Of The Reclaimability

The reclaimability of each film was evaluated by breaking up each sample of the film into flakes, conveying it through a die extruder at a temperature of about 280° C., and then cutting the resulting die extrudate into pellets. The formed pellets were then once again extruded at temperatures up to about 280° C. each, and pelletized twice in sequence.

A visual examination of the relative discoloration showed that the pellets containing polydiorganosiloxane were not colored any darker in comparison to the standard sample after passing two or three times through the extruder.

Measurements of the yellow color according to DIN 6167 resulted in the following yellow numbers:

| | | |
|---|---|---|
| 1. | additive-free polyester | 13.2 |
| 2. | polyester with an addition of 20% by weight polydimethylsiloxane | 12 |
| 3. | additive-containing polyester corresponding to 2. after passing through the extruder twice and pelletizing | 16 |
| 4. | additive-containing polyester corresponding to 2. after passing through the extruder three |  15.4 |

The results show that no measurable yellow coloring is to be determined; the differences of the measuring data lie within the scope of variability of measuring accuracy.

We claim:

1. Process for the production of an oriented, heat-set polyester film containing an amount of a polydiorganosiloxane a quantity of from 0.0001 to 2% by weight, the process
comprising the steps of: melting the polyester in an extruder; extruding the polyester through a die to give a cast film; quenching the extruded film; reheating the quenched film; stretch-orienting the film; and heat-setting the film,
wherein the polydiorganosiloxane is added to the polyester, which is free from polydiorganosiloxane, in the form of a masterbatch.

2. A process as claimed in claim 1, wherein the masterbatch contains up to 30% by weight of polydiorganosiloxane, relative to a total weight of polyester plus polydiorganosiloxane.

3. A process as claimed in claim 1, wherein the masterbatch contains up to 25% by weight of polydiorganosiloxane, relative to a total weight of polyester plus polydiorganosiloxane.

4. A process as claimed in claim 1, wherein the masterbatch is prepared by melting the polyester, then injecting the polydiorganosiloxane in a liquid state into the melt to produce a mixture of polyester and polydiorganosiloxane and thereafter extruding the melt comprising the mixture of polyester and polydiorganosiloxane to give a granulated product.

5. A process as claimed in claim 1, wherein the polydiorganosiloxane used is polydialkylsiloxane, polydiarylsiloxane, polyalkarylsiloxane or polyethersiloxane.

6. A process as claimed in claim 5, wherein the polydiorganosiloxanes are substituted with at least one member selected from the group consisting of fluorine groups, perfluoroalkyl groups and fatty acid ester groups.

7. A process as claimed in claim 5, wherein the polydiorganosiloxane has a viscosity above 100 mm$^2$/s at 25° C.

8. A process as claimed in claim 1, wherein the polyester used basically is a polyester homopolymer, a polyester copolymer or a mixture of various polyesters.

9. A process as claimed in claim 1, wherein the polyester film additionally contains inert particles.

10. A process as claimed in claim 7, wherein the viscosity of the polydiorganosiloxane is in the range from 1,000 to 50,000 mm$^2$/s.

11. A process as claimed in claim 8, wherein the polyester is polyethylene terephthalate.

* * * * *

UNITED STATES PATENT AND TRADEMARK OFFICE
CERTIFICATE OF CORRECTION

PATENT NO. : 4,921,670
DATED : May 1, 1990
INVENTOR(S) : Dallmann, et al.

It is certified that error appears in the above-identified patent and that said Letters Patent is hereby corrected as shown below:

Col. 7, line 12, change "siloxane a quantity of from 0.0001 to 2 % by weight" to --siloxane in a quantity of from 0.001 to 2 % by weight--.

Signed and Sealed this

Twenty-sixth Day of January, 1993

Attest:

DOUGLAS B. COMER

*Attesting Officer*     *Acting Commissioner of Patents and Trademarks*